3,824,218
PROTECTIVE SKIN CREAM
Lawrence W. McKenna, Jr., Wilbraham, Mass., assignor to Monsanto Company, St. Louis, Mo.
No Drawing. Filed June 12, 1970, Ser. No. 45,912
Int. Cl. A61k 7/00
U.S. Cl. 424—78
7 Claims

ABSTRACT OF THE DISCLOSURE

Disclosed herein is a skin cream which, when applied topically to the skin, provides an invisible protective coating which is a barrier against aqueous and polar organic solvents. The barrier component ingredient in the skin cream is a copolymer of a vinyl ester and a monoalkyl ester of maleic anhydride where the alkyl group contains from 14 to 22 carbon atoms.

BACKGROUND OF THE INVENTION

1. Field of the Invention

This invention relates to skin creams which provide an invisible and relatively insoluble protective coating which acts as a barrier against aqueous and polar organic solvents.

2. Description of the Prior Art

It is well known in the prior art that the skin can be protected by the application of lotions, creams and other emollient compositions. These preparations of the prior art are intended to exert a beautifying, softening, medicinal, and/or lubricating effect on the skin. Other compositioins have been described which have the effect of producing a barrier film on the skin which will prevent absorption of harmful or cosmetically undesirable substances into the skin. However, the skin creams of the prior art, while effective to some degree, have all suffered from certain disadvantages. Mere emollients fail to protect the skin from exposure to the injurious materials and only serve as palliative remedies afterwards. Barrier creams have been useful for certain specific conditions, but heretofore have failed to have broad general applicability. Furthermore, in maintaining personal hygiene, for example, by washing the hands, these compositions of the prior art are largely removed and repeated applications is necessary. It is evident that under such conditions the benefits obtained are not lasting and exposure to irritants and colorants may not actually be effective at all since the protection is readily removed.

Attempts have been made in the prior art to improve the barrier properties of skin creams to make them more repellent to aqueous and polar organic solvents. These attempts have included incorporating into the skin cream such materials as siloxanes (U.S. Pat. 2,727,846) and fluorocarbon elastomers (3,100,180). However, the siloxanes are themselves oily and when effective amounts are applied to the skin the residue may give rise to an unpleasantly oily subjective sensation. The fluorocarbon elastomers have certain drawbacks in that they are rather expensive and in certain instances incompatible with the base hand cream.

Moreover, the barrier skin creams of the prior art have required the use of thickeners, bodying agents and emulsifiers in conjunction with the ingredient that provides the barrier properties. In many instances the barrier ingredient was incompatible with the conventional thickeners, bodying agents and emulsifiers used in skin creams. Thus, problems arose in regard to the formulation and shelf stability of skin creams.

Thus, there exists in the prior art a definite need for a hand cream which will provide an invisible protective coating which is the barrier against aqueous and polar organic solvents. Moreover, a need exists in the art for a protective hand cream which is long lasting and not easily removed by exposure to soap and water.

A further need exists in the art for a barrier agent for hand creams which will also function as a thickener, bodying agent and/or emulsifier.

SUMMARY OF THE INVENTION

The present invention solves the above mentioned problems by providing a skin cream which, when applied topically to the skin provides an invisible protective coating which is a barrier against aqueous and polar organic solvents. Moreover, this skin cream leaves no oily residue on the skin and withstands repeated washings with soap and water.

The ingredient in the skin cream which provides the barrier to aqueous and polar organic solvents is a copolymer of a vinyl ester and a monoalkyl ester of maleic acid wherein the alkyl group contains from 14 to 22 carbon atoms. This copolymer may also serve as a thickener, bodying agent and/or emulsifier in the resulting skin cream.

DESCRIPTION OF THE PREFERRED EMBODIMENTS

The protective skin cream of the present invention comprises an aqueous pharmaceutical extending medium as hereinafter defined which contains from 5 to 50% by weight based on the weight of the skin cream, of a copolymer of a vinyl ester and a monoalkyl ester of maleic acid wherein the alkyl group contains from 14 to 22 carbon atoms. The term "pharmaceutical extending medium" as used herein includes such preparations as the bases for lotions, creams, ointments and the like water-based preparations for topical application, which are sufficiently bodied so that the resultant cosmetic is not watery or excessively thin. The viscosity range and compositions of the "pharmaceutical extending medium" will vary over a very broad range and this term should not be construed as being limited to a single type of preparation.

The skin creams of the present invention may range from that of a lotion having a Brookfield viscosity of about 200 centipoises through a flowable jelly, to that of petroleum jelly, i.e., fairly stiff but flowable under mechanical force.

Examples of hydrophilic pharmaceutical extending media are set forth in the Journal of the American Pharmaceutical Association, Volume 30, pages 196–201, 1941; in the Practicing Edition of the same Journal, Volume 1, page 210, 1940; Volume 3, pages 231–234 and 324–326, 1942; and in the British Journal of Dermatology and Syphilology, Volume 50, pages 540–543, 1938. These bases consist of an aqueous suspension of one or more ingredients as well as dissolved materials and may require addition of thickening agents.

Illustrative of the types of materials which optionally may be incorporated into the skin creams of the present invention are humectants, therapeutic ingredients, perfumes, colorants, ultraviolet light barriers, sun tanning compounds, etc.

The conventional pharmaceutical extending media used in skin creams comprises the aqueous base which usually contains thixotropic bodying agents or thickeners, extenders, emulsifiers, etc. In addition to water, the aqueous base may comprise alcohol or other solvents in amounts up to a few percent, not usually more than about 10 percent by volume.

The conventional bodying agents include not only hydrophilic thickeners such as polyvinyl alcohol, methyl cellulose, polyethylene glycols and hydrophilic gums such as gum tragacanth and gum kharaya but also hydrophobic materials such as stearic acid, cetyl alcohol, lanolin, petrolatum, cholestrol which are more or less waxy, as well as solids such as bentonite. In general when hydrophilic thickening agents are employed, it is not necessary to include emulsifying agents. However, when hydrophobic or solid thickening agents are employed, some emulsifying or plasticizing agent is usually necessary. In the selection of these ingredients, as well as where medicaments or therapeutic ingredients are added, it is necessary to choose materials which are compatible with the system as a whole. In general substances rendering the mixture either strongly acidic or strongly basic, or substances giving high ionic strength should be avoided.

One of the features of the present invention is that the copolymers, which are used as the barrier ingredients in the present invention, serve as a thickener, bodying agent and emulsifier as well as its primary function as a barrier component. This feature of the present invention represents a significant advance over the skin creams of the prior art which required thickeners, bodying agents and/or emulsifier as well as the barrier agent. The resulting ease of formulation of the skin creams of the present invention should be apparent to those skilled in the art.

The vinyl esters which are used to prepare the copolymer which acts as the barrier component correspond to the following general formula:

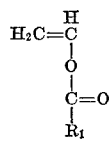

wherein $R_1$ is selected from the group comprising hydrogen, alkyl groups of from 1 to 10 carbon atoms, aryl groups of from 6 to 10 carbon atoms including the carbon atoms in ring substituted alkyl substituents. Examples of these vinyl esters include vinyl formate, vinyl acetate, vinyl propionate, vinyl butyrate, vinyl valerate, vinyl caproate, vinyl benzoate, etc. The preferred vinyl ester for use as a comonomer of the present invention is vinyl acetate.

The monoalkyl esters of maleic acid which are copolymerized with the vinyl ester in the preparation of the barrier components of this invention are those esters wherein the alcohol moiety is an alkyl radical of from 14 to 22 carbon atoms. These are conventionally prepared by reacting maleic anhydride with a long chain alcohol such as cetyl alcohol, palmityl alcohol, stearyl alcohol, etc. Especially preferred are those monoalkyl esters prepared from maleic anhydride and alcohols containing from 16 to 20 carbon atoms. Most especially preferred is mono-octodecyl maleate. Preferably from 10 to 100 mole percent of the anhydride groups are esterified and more preferably from 40 to 100 mole percent of the anhydride groups are esterified. The especially preferred copolymers are those wherein 100 mole percent of the anhydride groups are esterified. In these polymers half of the carboxylic groups of the anhydride starting material are esterified and the other half are free carboxylic acid groups. However, it has been found that neutralization of at least a portion of the remaining carboxylic acid groups results in a composition having enhanced properties. Thus, the carboxylic function may be neutralized with basic compounds such as ammonia and volatile primary, secondary, tertiary, alkyl and alkanol amines. In selecting a suitable amine care should be given to both the volatility and to minimizing any residual amine odor in the skin cream.

The preferred composition range for the copolymeric barrier component is from 1 to 5 mols of vinyl ester to 1 mol of the monoalkyl maleate. Especially preferred are those copolymers which contain approximately equimolar amounts of the vinyl ester in the monoalkyl maleate.

The copolymeric barrier components used in the present invention have number average molecular weights of from 10,000 to 350,000 and preferably from 50,000 to 200,000.

The vinyl ester-monoalkyl maleate copolymers are prepared using conventional copolymerization methods. These methods are well known to those skilled in the art and need no further explanation here.

The hand creams of the present invention are prepared by incorporating from 5 to 50 parts by weight, based on the weight of the skin cream, of the vinyl ester-monoalkyl maleate copolymer into the aqueous pharmaceutical extending media. More preferably, one would incorporate from 10 to 30 parts by weight of the copolymer into the aqueous pharmaceutical extending medium. These materials are incorporated into the aqueous pharmaceutical extending media by conventionl formulating techniques such as first preparing the aqueous pharmaceutical extending media and then incorporating the vinyl ester copolymer by blending or mixing. Alternatively, the vinyl ester copolymer may be blended in with the ingredients in the preparation of the aqueous phamraceutical extending media.

The following examples are set forth in illustration of the present invention and should not be construed as a limitation thereof. Unless otherwise indicated, all parts and percentages given are by weight.

EXAMPLE 1

This example describes the preparation of a conventional emollient skin cream which is used as a base in preparing the protective skin creams of the present invention.

The base skin cream is prepared using the following ingredients:

| | Parts by weight |
|---|---|
| Beeswax | 13.0 |
| Petrolatum | 12.0 |
| Mineral Oil (light viscosity) | 20.0 |
| "Lantox" 55 (lanolin) | 20.0 |
| Preservative | 0.5 |
| Water | 34.0 |
| Borax | 0.8 |
| Perfume | Trace |

The beeswax, petrolatum, mineral oil and lanolin are heated together at about 70° C. The water, preservative and borax are mixed and heated to 75° C. The hot aqueous solution is then added slowly to the hot mixture of waxes and oils while maintaining agitation. Stirring is continued and the perfume is added when the temperature of the batch reaches 50° C. After the addition of the perfume agitation is discontinued and the formulation is allowed to cool to room temperature. The resulting product is a conventional emollient skin cream. When this cream is applied topically to the hands it imparts a smooth feeling to the hand. Washing the hands in 43.4 C. water with a mild soap readily removes the skin cream from the hands necessitating further application of skin cream if further emollient action is to be obtained.

EXAMPLE 2

Eighty-five (85) parts of the base cream prepared in Example 1 is melted at about 80° C. and 15 parts of a powdered 100 mole percent half-ester copolymer of vinyl acetate and mono-octadecyl maleate is vigorously dispersed into the melted base. The copolymer, which contains approximately equimolar amounts of vinyl acetate and maleate comonomers, has a number average molecular weight in the range of from 50,000 to 200,000. When the composition is thoroughly mixed, the agitation is discontinued and the formulation is allowed to cool. The final composition, when rubbed into the hands, imparts a smooth feeling and leaves an invisible, protective film which is water repellent. This protective film remains on the hands after three washings in 110° F. water with a mild soap.

EXAMPLE 3

Example 2 is repeated here except that 90 parts of the base cream and 10 parts of the copolymer are used. Comparable results are obtained when the formulated cream is rubbed onto the hands which are then washed and dried three times.

EXAMPLE 4

A skin cream in the form of a lotion is prepared by mixing the following ingredients:

| Ingredient: | Parts by Weight |
|---|---|
| Glyceryl Monostearate | 10.0 |
| Mineral Oil | 20.0 |
| Olive Oil | 10.0 |
| Cetyl Alcohol | 6.0 |
| Butyl p-Hydroxy benzoate | 0.2 |
| Glycerol | 2.5 |
| Stearic Acid | 3.0 |
| Water | 600.0 |

To one hundred parts of this lotion there is added 650 parts of a 15% solids aqueous dispersion of a partially neutralized copolymer of vinyl acetate and monooctodecyl maleate. The mole ratio of vinyl acetate to maleate in this copolymer is approximately one to one while the molecular weight of this copolymer is in the range of 50,000 to 200,000.

The formulated lotion is both water repellent and soothing to the hands. The protective film imparted by this lotion remains on the hands after three washings in 110° F. water with a mild soap. In a control example which did not contain any vinyl acetate/monooctodecyl maleate copolymer, the lotion is readily washed off after only one washing.

EXAMPLE 5

Example 4 is repeated here except using 150 parts of the copolymer dispersion used in Example 4. Comparable results are obtained when the formulated cream is rubbed onto the hands which are then washed and dried three times.

EXAMPLE 6

Another hand lotion is prepared by mixing (a) 100 parts of the aqueous dispersion of vinyl acetate/monooctodecyl maleate used in Example 4, (b) 100 parts of water, and (c) about 5 parts of pearl grade stearic acid using heating (80° C.) and stirring. This mixture is adjusted to a pH of about 6.0 with ammonium hydroxide and then added to a hot (80° C.), stirred emulsion of about 12 parts of polyethylene glycol monostearate in water. The copolymeric barrier ingredient is a 25 mole percent ammonium salt and the polyethylene glycol monostearate is characterized as having a melting point of about 33–38° C. which is represented by the following formula:

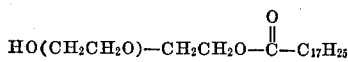

This material is available commercially from Glyco Products Co.

The emulsion becomes thick and creamy and on cooling is highly suitable as a hand cream. When applied to the hands it imparts a smooth feeling to the hands. The barrier properties of this skin cream are illustrated by dipping the protected area into xylene and into methyl ethyl ketone, shaking off excess solvent and permitting the wetted area to dry. In neither case is there evidence of the whitening of the surface of the skin occasioned by removal of the oils therefrom which is observed when untreated hands are rinsed in these and other solvents. Even after washing the hands with soap and water there is substantially no effect of the solvents on the skin when again drenched in these two solvents. A hand lotion containing the same hydrophilic pharmaceutical base and prepared similiarly, employing only water instead of the dispersion of vinyl acetate/monooctodecyl maleate fails to give any protection to the hands against solvents and this control material was readily washed off with soap and water.

EXAMPLE 7

This example illustrates a skin cream wherein the copolymers of the present invention function as a barrier agent and also as a bodying agent and emulsifier.

In this example the following ingredients are used:

| | Parts |
|---|---|
| Water (200° F.) | 63 |
| Ammonium hydroxide (29% $NH_3$) | 1 |
| Poly(vinyl acetate/monooctodecyl maleate) | 18 |
| Mineral Oil | 8 |
| Ethyl Alcohol | 10 |

The water, ammonium hydroxide and poly(vinyl acetate/monooctodecylmaleate) are stirred vigorously in a closed vessel. After complete dispersion of these ingredients is obtained the mineral oil and ethyl alcohol are added and the dispersion is cooled to room temperature.

A smooth, stable, homogeneous lotion is obtained which still gives some protection to the skin even after three washings with mild soap and water.

The protective action of the lotion is compared with that of two commercial protective or barrier creams which are believed to be, respectively, combinations of methyl cellulose with vegetable wax and with stearic acid. Each commercial preparation is rubbed on the skin of the forearm of a test subject, in marked adjacent areas approximately 5 x 5 cms. A solution of 1.0 oz. water soluble blue in 100 cc. of water was applied to the test areas. After about 1 minute, the dye was removed by blotting. The amount of staining of the skin thus produced indicated the effectiveness of the barrier protection of these commercial skin creams. The skin cream prepared in this example and the two commercial preparations gave good protection immediately after application as shown by the very faint staining evident after removal of excess dyestuff, while the unprotected portion of the skin was dyed bright blue. After washing the areas of application with soap and warm water, and again temporarily applying the dye solution as before, the area covered by the lotion prepared in this example showed faint staining. The other areas including those where the two commercial preparations had been applied showed marked staining, thus illustrating the superior barrier properties of the skin creams of the present invention.

EXAMPLE 8

Example 7 is repeated here except using isopropyl alcohol instead of the ethyl alcohol used in Example 7. The resulting skin cream was comparable to that prepared in Example 7 in regard to affording a barrier to blue dye and resistance to water.

EXAMPLE 9

Example 8 is repeated here except that triethanol amine is used in place of the ammonium hydroxide used in Example 7. The resulting skin cream is comparable to that prepared in Example 7 in regard to affording a barrier to blue dye and resistance to water.

EXAMPLES 10 TO 16

The following Examples are set forth to show variations in copolymeric barrier compounds which may be used within the scope of this invention. In each example vinyl acetate is used as the comonomer. The compositions of these copolymeric barrier compounds are tabulated in the following Table I.

TABLE 1.—SUMMARY OF EXAMPLES 10 TO 16

| Ester used | Mol. percent esterification | Neutralized [1] |
|---|---|---|
| Example: | | |
| 10 _____ Octodecyl ($C^{18}$) ____ | 100 | Morpholine. |
| 11 _____ do _____ | 100 | Ethanolamine. |
| 12 _____ do _____ | 80 | Ammonium hydroxide. |
| 13 _____ do _____ | 80 | Triethanol amine. |
| 14 _____ Eicosyl ($C_{20}$) _____ | 100 | Ammonium hydroxide. |
| 15 _____ Hexadecyl ($C_{16}$) ____ | 100 | Do. |
| 16 _____ do _____ | 100 | Triethanol amine. |

[1] Free acid groups on the ester of maliec anhydride neutralized with the components indicated.

The viscosities of the skin creams of the present invention may be varied by the amount of polymer components used as well as by varying the type and amount of ester used, the amount of neutralization, of the unesterified carboxylic acid, the use of organic solvents, etc. Other variations will become apparent to those skilled in the art upon reading the present invention.

What is claimed is:

1. A process which comprises applying topically to the skin an effective amount of a barrier composition to protect the skin from aqueous and polar organic solvents wherein the barrier composition comprises an aqueous dispersion of a copolymer of a vinyl ester and an alkyl maleate; wherein the mole ratio of vinyl ester to alkyl maleate in the copolymer is between 5:1 and 1:1 and the number average molecular weight of the copolymer is between 10,000 and 350,000; wherein the vinyl ester is selected from the group consisting of vinyl formate; vinyl acetate, vinyl propionate, vinyl butyrate, vinyl valerate, vinyl caproate, and vinyl benzoate; wherein the alkyl maleate is the reaction product of an aliphatic alcohol containing between 16 and 20 carbon atoms and maleic anhydride in the mole ratio of 1:0.4 to 1:1 and wherein the amount of copolymer in the aqueous dispersion is in the range of from 5 to 50 weight percent of the aqueous dispersion.

2. The process of claim 1 wherein the aliphatic alcohol is ceytl alcohol or octadecyl alcohol.

3. The process of Claim 2 wherein the mole ratio of alcohol to maleic anhydride is 1:1.

4. The process of Claim 1 wherein the barrier composition contains an emollient.

5. The process of Claim 1 in which the copolymer is neutralized up to 100 percent with ammonia or an amine selected from the group consisting of morpholine, ethanolamine and triethanolamine.

6. The process of Claim 1 wherein the vinyl ester is vinyl acetate.

7. A process which comprises applying topically to the skin an effective amount of a barrier composition to protect the skin from aqueous and polar organic solvents wherein the barrier composition comprises a copolymer of vinyl acetate and mono-octadecyl maleate in the range of from 5 to 50 weight percent of the composition; wherein the mole ratio of vinyl acetate to mono-octadecyl maleate in the copolymer is between 5:1 and 1:1 and the number average molecular weight of the copolymer is between 10,000 and 350,000 and wherein the copolymer is 100 percent neutralized with ammonia or an amine selected from the group consisting of morpholine, ethanolamine and triethanolamine.

References Cited

UNITED STATES PATENTS

| 3,100,180 | 8/1963 | Smith et al. | 424—78 |
| 2,816,655 | 12/1957 | Crozier et al. | 206—59 |
| 2,806,020 | 9/1957 | Scott et al. | 260—29.6 UX |
| 3,092,600 | 6/1963 | Ozawa et al. | 260—29.6 |
| 3,268,491 | 8/1966 | Hattori et al. | 260—29.6 X |

OTHER REFERENCES

Sagarin, Cosmetics Science & Technology, 1957, pp. 111 to 114, 116, 117, 127, 134, 160, 161 and 176.

ALBERT T. MEYER, Primary Examiner

N. H. DREZIN, Assistant Examiner

U.S. Cl. X.R.

424—358